United States Patent
Kasprick

(10) Patent No.: US 8,966,953 B2
(45) Date of Patent: Mar. 3, 2015

(54) METHOD AND APPARATUS FOR MEASURING HELICAL PILE INSTALLATION TORQUE

(71) Applicant: Helical Pier Systems Ltd., Sherwood Park (CA)

(72) Inventor: Ben Kasprick, Sherwood Park (CA)

(73) Assignee: Helical Pier Systems Ltd., Calgary (CA)

( * ) Notice: Subject to any disclaimer, the term of this patent is extended or adjusted under 35 U.S.C. 154(b) by 86 days.

(21) Appl. No.: 13/841,159

(22) Filed: Mar. 15, 2013

(65) Prior Publication Data
US 2014/0123725 A1      May 8, 2014

Related U.S. Application Data

(60) Provisional application No. 61/724,077, filed on Nov. 8, 2012, provisional application No. 61/721,869, filed on Nov. 2, 2012.

(51) Int. Cl.
| | | |
|---|---|---|
| *G01G 19/56* | (2006.01) | |
| *G01G 23/01* | (2006.01) | |
| *G01L 25/00* | (2006.01) | |
| *G01L 3/02* | (2006.01) | |
| *G01L 3/04* | (2006.01) | |
| *G01L 3/14* | (2006.01) | |

(52) U.S. Cl.
CPC .............. *G01L 3/04* (2013.01); *G01L 25/003* (2013.01); *G01L 3/1464* (2013.01)
USPC ...................... 73/1.09; 73/862.08; 73/862.191

(58) Field of Classification Search
CPC ......... G01L 25/003; G01L 5/24; G01L 25/00; G01L 3/108; G01L 3/04; B25B 23/1405
USPC ................................ 73/1.09, 862.191, 862.08
See application file for complete search history.

(56) References Cited

U.S. PATENT DOCUMENTS

| | | | | | |
|---|---|---|---|---|---|
| 2,955,454 | A | * | 10/1960 | Husher | 73/1.11 |
| 3,099,155 | A | * | 7/1963 | Dean | 73/862.08 |
| 3,675,464 | A | * | 7/1972 | Larson | 73/1.12 |
| 3,850,133 | A | * | 11/1974 | Johnson | 116/212 |
| 3,965,429 | A | * | 6/1976 | Roberts, III | 327/516 |
| 4,459,862 | A | * | 7/1984 | Fillmore et al. | 73/862.01 |
| 4,909,685 | A | * | 3/1990 | Hirst | 411/9 |
| 5,337,608 | A | * | 8/1994 | Egan et al. | 73/865.6 |
| 5,509,316 | A | * | 4/1996 | Hall | 73/862.25 |
| 6,446,735 | B1 | * | 9/2002 | Chen | 173/93.5 |
| 6,575,042 | B1 | * | 6/2003 | Rinner | 73/847 |
| 6,640,651 | B2 | * | 11/2003 | Honjo | 73/862.08 |

(Continued)

*Primary Examiner* — Lisa Caputo
*Assistant Examiner* — Jamel Williams
(74) *Attorney, Agent, or Firm* — Saliwanchik, Lloyd & Eisenschenk

(57) ABSTRACT

Embodiments of the subject invention are directed to a method and apparatus for measuring torque applied during installation of a helical pile. Specific embodiments relate to a helical pile installation torque measuring and monitoring system for use during helical pile installation. In a specific embodiment, a load cell pin, or torque pin, is incorporated into the drive head and equipment attachment to measure the direct forces, or torque, that is being applied by the drive head as the helical pile is rotated into the ground. The direct forces, or torque, are relayed to a data capturing device, which records the data and, optionally, displays one or more of the following: the forces, the torque created by the forces, the inclination angle of installation, and the downward, or longitudinal, force applied to advance the helical pile.

40 Claims, 6 Drawing Sheets

(56) References Cited

U.S. PATENT DOCUMENTS

| | | | |
|---|---|---|---|
| 8,490,500 B2* | 7/2013 | Foster et al. | 73/862.21 |
| 2002/0050177 A1* | 5/2002 | Honjo | 73/862.08 |
| 2010/0025063 A1* | 2/2010 | Kuhnapfel et al. | 173/203 |
| 2012/0118079 A1* | 5/2012 | Foster et al. | 73/862.21 |
| 2014/0123725 A1* | 5/2014 | Kasprick | 73/1.09 |

* cited by examiner

METHOD AND APPARATUS FOR MEASURING HELICAL PILE INSTALLATION TORQUE

CROSS-REFERENCE TO RELATED APPLICATIONS

The present application claims the benefit of U.S. Provisional Application Ser. No. 61/724,077, filed Nov. 8, 2012, and U.S. Provisional Application Ser. No. 61/721,869, filed Nov. 2, 2012, which are both hereby incorporated by reference herein in their entirety, including any figures, tables, or drawings.

BACKGROUND OF INVENTION

Helical piles, also known as screw piles or screw anchors, are structural deep foundation elements used to resist against forces exerted by axial compression, tension, and/or lateral loading (Bradka, 1997). Typical helical piles utilize one or more helical plates affixed around one end, the toe end, of a continuous central shaft of smaller diameter with a connection plate at the opposite or top end. Multiple helices used on the toe end of a central shaft can be of equal diameters or have a smaller diameter towards the toe of the pile. Helical piles are usually, but not exclusively, fabricated from steel that can also be galvanized for extra protection against corrosion. Helices are attached to the shaft most commonly by welding, but may also be bolted, riveted, or monolithically made with the shaft (Bradka, 1997).

In use, a helical pile is basically rotated into the soil such that the helical plate engages with the soil to advance the pile into the ground. As a result, there is minimal or no vibration associated with the installation of helical piles, unlike most driven piles. Further, the helices are configured for soil displacement rather than soil excavation, so there is little or no spoil to be removed. Once the helical pile has been installed to depth the helical plates create a bearing surface to distribute the axial load to the surrounding soil.

Helical pile capacity is based on soil parameters and equations relating soil parameters, size of helix(s), shaft size and length, to capacity. Soil, however, is rarely homogenous and is highly variable so soil parameters used in design, along with capacity, must be validated in the field to ensure the foundation will perform as designed. Typically soil parameters are determined through geotechnical bore holes drilled at various locations and represent only a sample of what may be encountered due to the high variability. The capacity of deep foundations is typically validated through load tests which are costly, time consuming, and cannot validate a 100% of the installed piles. Accordingly, a large margin for error in actual capacities vs. calculated capacities can exist when calculated capacities are based on geotechnical bore hole and load test alone. Therefore, it is industry practice to use a measure of the force, in the form of torque, required to drive the helical pile into the ground as a way to verify that soil parameters used in design are similar at each pile location to what was used for the design. Through the collection of large amounts of load testing data, along with collecting the torques applied during installation, and correlating the load testing data and the torques applied during installation, the amount of torque required to achieve a certain load carrying capacity can be determined, and the soil parameters used in the design can be validated to show the soil parameters used to design the pile and/or the pile configurations are in fact valid at each pile location. Unfortunately, the mechanisms and techniques for measuring the torque during installation of a helical pile typically involves measuring the hydraulic fluid pressure required to rotate the drive head motor as the helical pile is being installed. The theoretical pressure conversions to torque are derived from the manufacturer of the drive head motors, and the hydraulic fluid pressures are then used to calculate the estimated torque that is applied to the helical pile as it is being rotated into the ground. The accuracy of this method of measuring torque is highly variable and depends on many factors, such as motor efficiency, length and configuration of hydraulic hosing, hydraulic back pressures, speed of installation, and downward or upward force being applied. In particular, the amount of downward or upward force being applied to the pile during installation can give way to false torque readings and is highly influenced by different operator's methods. This method of using hydraulic fluid pressure to estimate torque is further complicated by the difficulty of recalibrating the pressure to torque correlation factor of the drive head as the motor wears and loses efficiency.

BRIEF SUMMARY

Embodiments of the subject invention are directed to a method and apparatus for measuring torque applied during installation of a helical pile. Specific embodiments relate to a helical pile installation torque measuring and monitoring system for use during helical pile installation. In a specific embodiment, a load cell pin, or torque pin, is incorporated into the drive head and equipment attachment to measure the direct forces, or torque, that is being applied by the drive head as the helical pile is rotated into the ground. The direct forces, or torque, are relayed to a data capturing device, which records the data and, optionally, displays one or more of the following: the forces, the torque created by the forces, the inclination angle of installation, and the downward, or longitudinal, force applied to advance the helical pile.

In a specific embodiment, the standard pin that is used to connect the bail of the drive head to the driving equipment is replaced with an embodiment of the subject torque pin. Embodiments of the subject torque pin incorporate one or more strain gauges. Further embodiments also incorporate one or more accelerometers and wiring to relay the data from the strain gauges to a point where the data can be captured. One or more strain gauges can be mounted within, mounted on, or integrated with, the torque pin. In a specific embodiment, one or more strain gauges can be mounted in slots, or grooves, machined in the torque pin. Specific embodiments locate the slots in precise stress transfer locations, between the torque pin and the drive head. In an embodiment, an accelerometer can be mounted in the center, or top center, of the torque pin.

In specific embodiments, the torque pin is located at the connection point between the drive head and the attachment to the driving equipment that is the first non-rotating part of the driving equipment that bears the full reaction of the applied torque. In an embodiment, this placement of the torque pin can allow for wiring from the strain gauges to be fed back to the data capturing device. Other locations for the interconnection of the torque pin with the drive head and driving equipment can be used. In specific embodiments data from one or more strain gauges can be wirelessly transmitted to the data capturing device. By measuring the amount of force applied by one or more locations on the drive head connection, or bail, to the torque pin while the helical pile is being rotated into the ground the torque applied to the helical pile as it is being installed can be calculated, monitored, and/or recorded.

In order to use the torque pin with one or more strain gauges to measure torque, a calibration from the one or more forces applied to the torque pin at a corresponding one or more locations and the strain experienced by a corresponding one or more strain gauges can be used to calculate torque from the measured strain measurements. To determine such calibration, a system can be used to calibrate and correlate the stress and/or strain measurements with the applied forces. The calibration system can utilize a calibration table, which can be used to simulate how the forces are transferred from the drive head to the driving equipment for the helical pile via the torque pin. The calibration table can be utilized to obtain the calibration by mounting the torque pin into a stationary machined block that is mounted to a table via, for example, T-slot bolts in T-grooves. Two machined sleeves can be fit over the two ends of the torque pin. The sleeves then transfer forces applied to the sleeves from two hydraulic cylinders. Preferably, the sleeves are fitted such that the force applied by the sleeve onto the torque pin is applied at the same location on the torque pin as will be applied by the bail of the drive head when the torque pin interconnects the drive head to the driving equipment for the helical pile. The forces applied to the sleeves by the hydraulic cylinders are applied to the torque pin in opposite directions and equal magnitudes to simulate the coupled force (torque) that is experienced at the connection of the drive head and the attachment to the driving equipment. The block within which the torque pin is positioned provides a counter torque to prevent the torque pin from rotating. The applied forces are recorded by load cells attached to the hydraulic cylinders and sleeves. The torque pin is placed and secured through the sleeves and the machined block in the same, or similar, manner to which the torque pin attaches the drive head to the driving equipment. Once the torque pin is secured, the hydraulic cylinders apply incremental loads up to the maximum design load of the torque pin. The stress and/or strain gauges on the torque pin are connected to a data capturing device that measures and records the readings, such as change in resistance, from the stress and/or strain gauges. A correlation is then developed that relates the force, or forces, applied to the torque pin to the change in signal output from the stress and/or strain gauges. With this correlation and the positions the applied forces are applied to the torque pin, the applied torque can be calculated, and, optionally, programmed into the readout from the data capturing device.

DETAILED DISCLOSURE

Embodiments of the subject invention are directed to a method and apparatus for measuring the torque applied during the installation of a helical pile. Specific embodiments relate to an improved helical pile installation torque measuring and monitoring system. Embodiments of the subject torque measuring and monitoring system can be used in conjunction with an existing helical pile installation drive head and attachment to the equipment.

Figure 1:
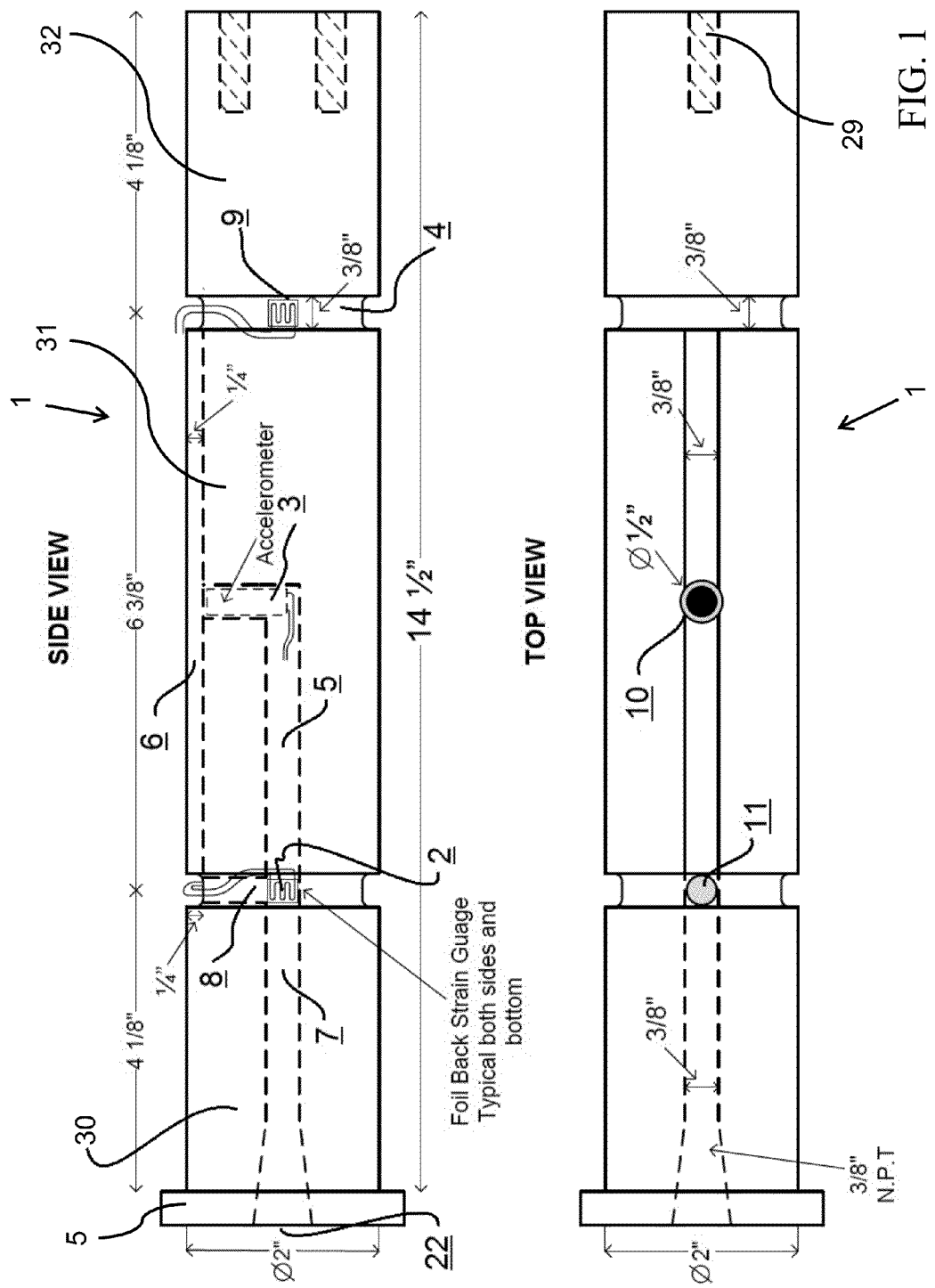
FIG. 1 shows a side view and a top view of an embodiment of a torque pin machined to allow the placement of the strain gauges, accelerometer, and wiring to carry signals from the strain gauges, in accordance with an embodiment of the invention.
Figure 2:
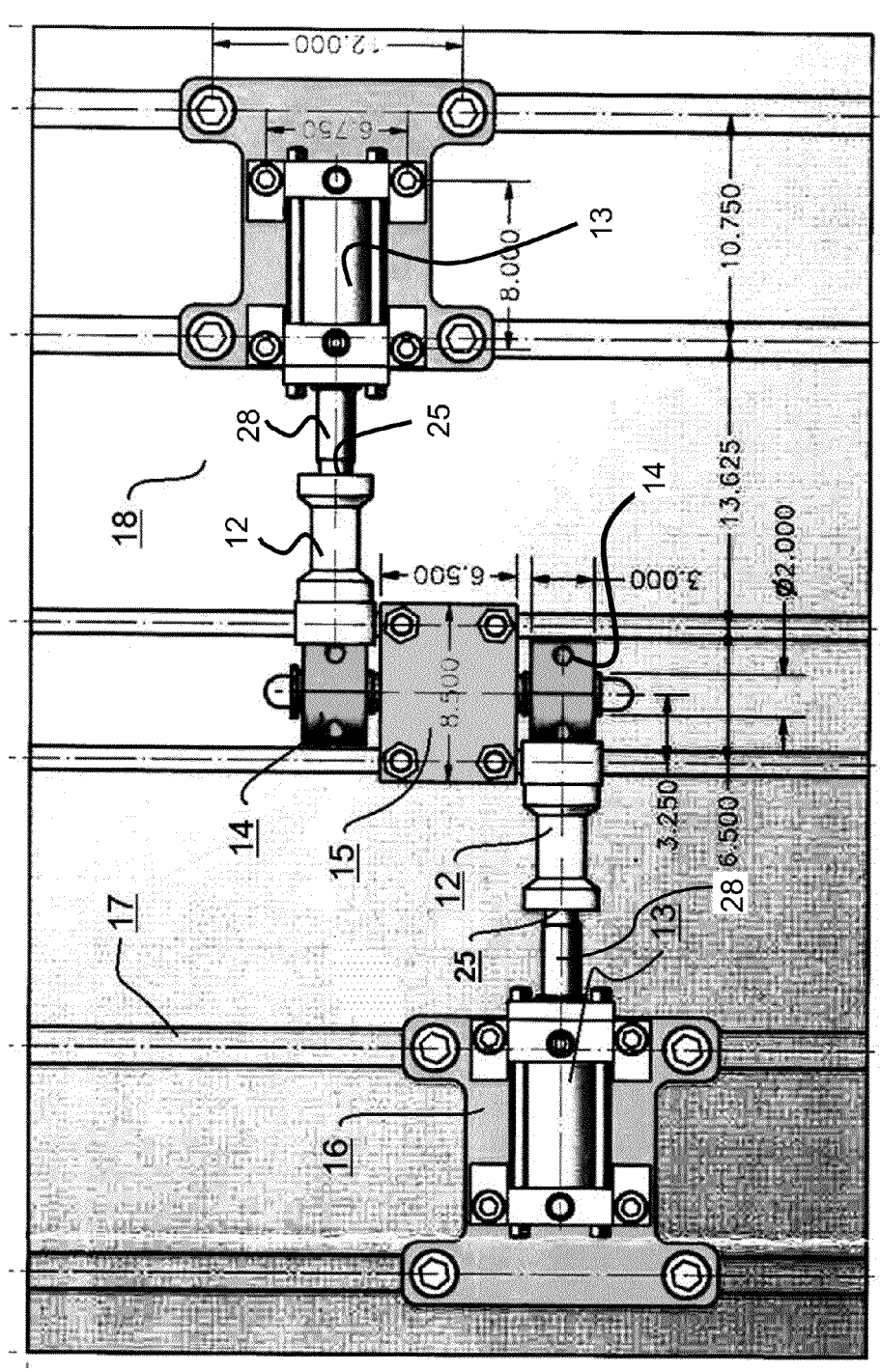
FIG. 2 shows a plan view of a calibration table which can be used to calibrate a torque pin, showing load cells, mounting blocks to keep the pin stationary, hydraulic jacks to apply forces in opposite directions, and sleeves to secure the pin.
Figure 3:
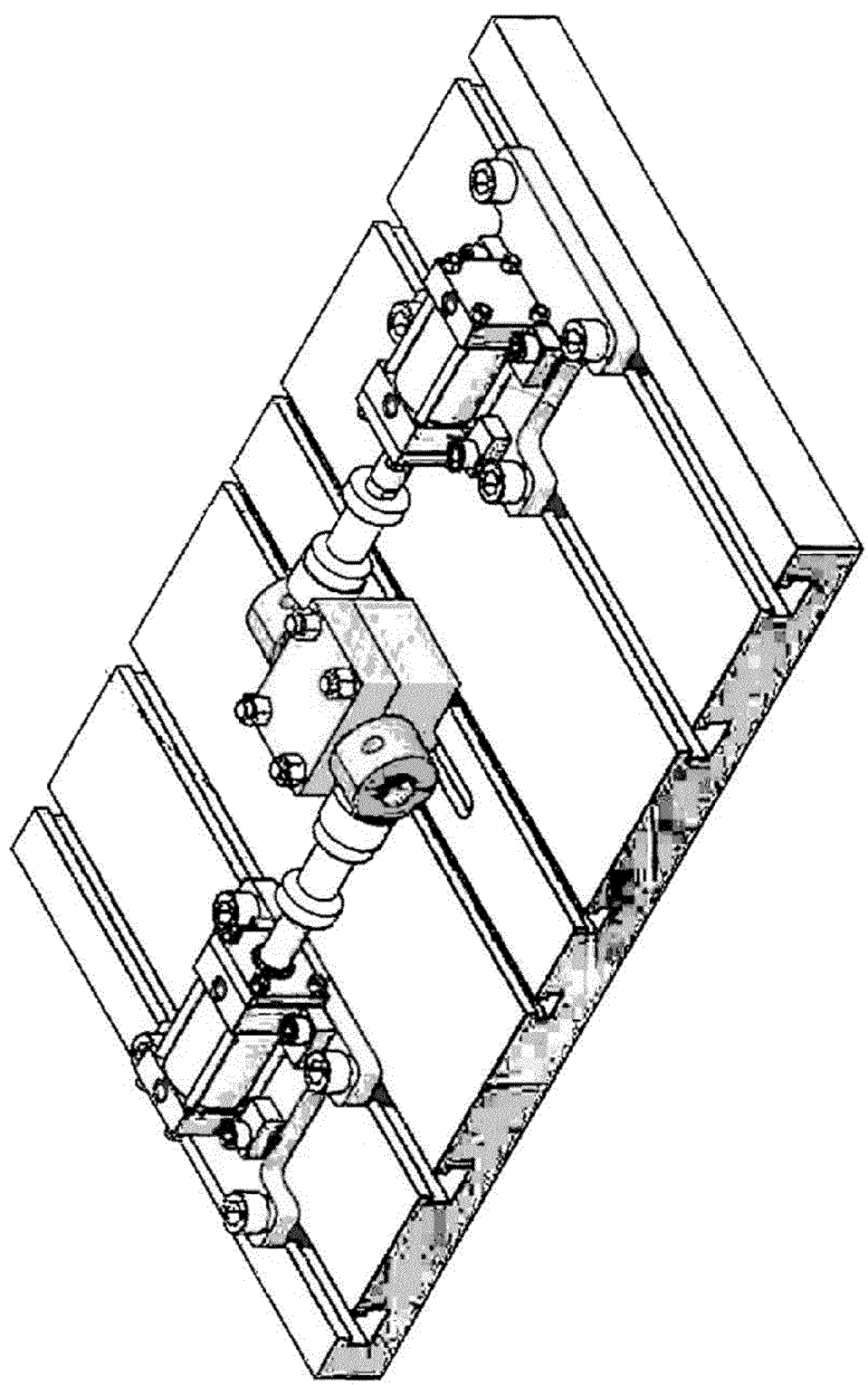
FIG. 3 shows an isometric view of the calibration table of FIG. 2.
Figure 4:
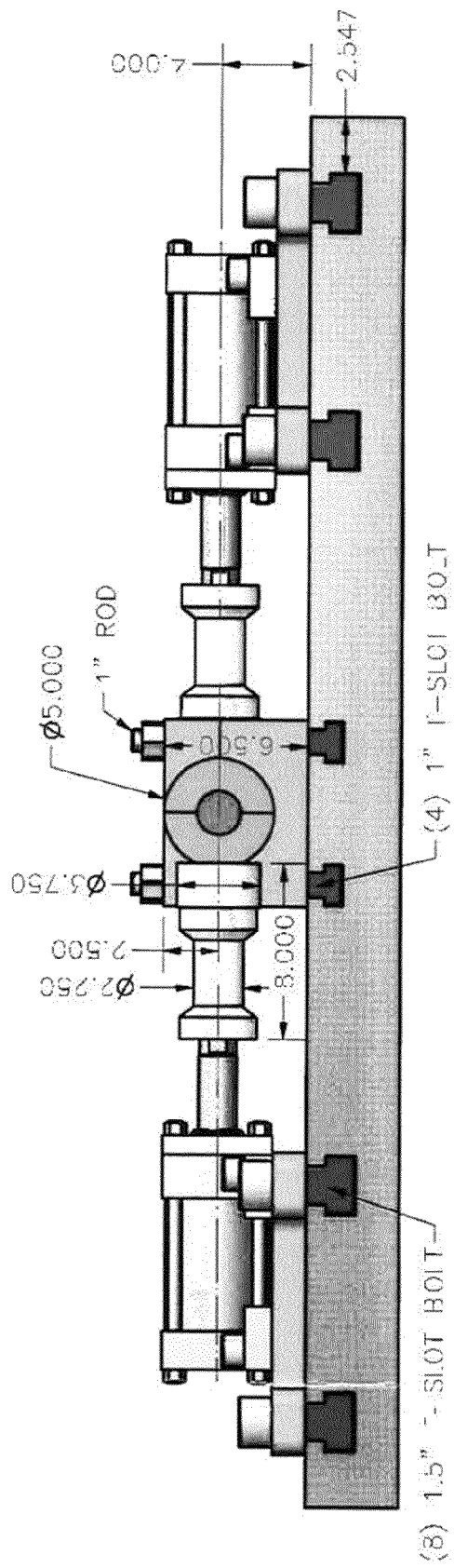
FIG. 4 shows an elevation view of the calibration table of FIG. 2.
Figure 5:
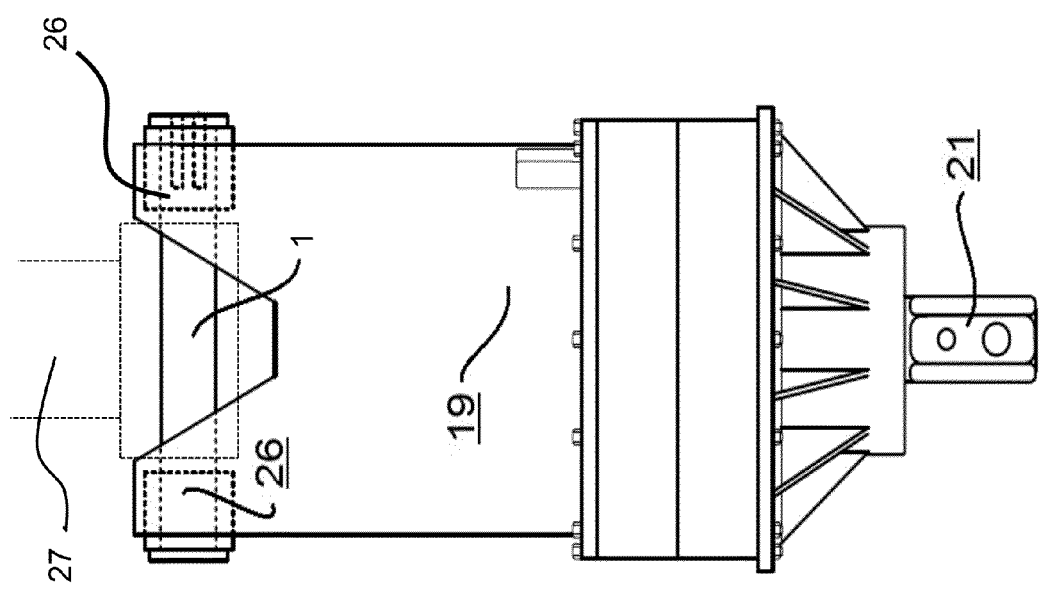
FIG. 5 shows a helical pile installation drive head that illustrates the placement of an embodiment of a torque pin in relation to the drive head and driving equipment attachment.
Figure 6:
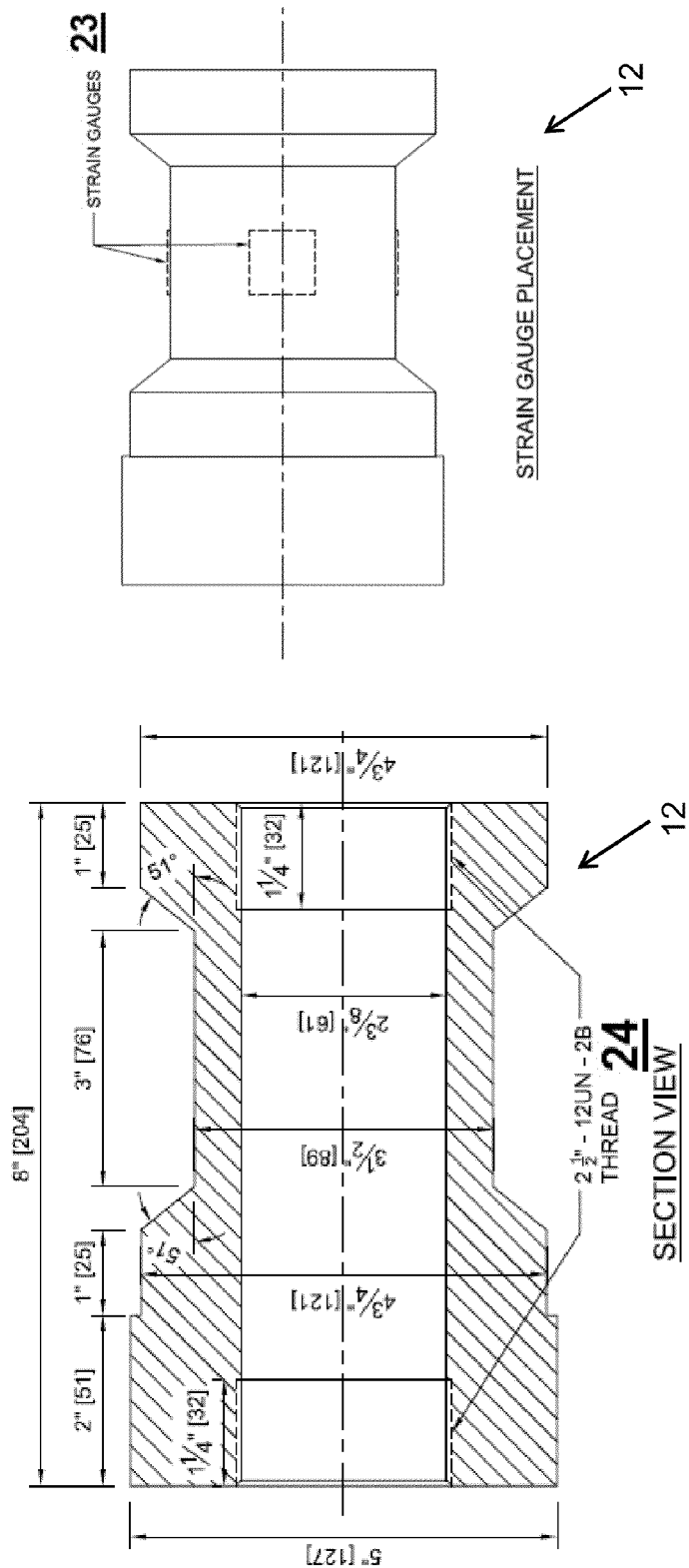
FIG. 6 shows a load cell fabricated to be used in conjunction with the calibration table of FIG. 2.

Referring to FIGS. 1-6, specific embodiments of the subject invention are shown. FIG. 1 shows a torque pin 1 that can be used to interconnect a drive head to driving equipment during the installation of a helical pile into a stratum. In the embodiment shown in FIG. 1, the torque pin 1 is machined in such a way to provide grooves 4 and 8 at specific locations at opposing ends. Strain gauges 2 and 9 are mounted on the body of the torque pin within the grooves. In alternative embodiments, the strain gauges can be located at other locations on the torque pin. Specific embodiments do not place the strain gauges in grooves in the torque pin. In specific embodiments, the grooves can be at least 1/16 inch, at least 1/8 inch, at least 3/16 inch, at least 1/4 inch, less than or equal to 1/4 inch deep, or other depth that accommodates the placement of the strain gauge, and optionally the strain gauge wiring, so as to protect the strain gauge, and optionally the strain gauge wiring, from damage as the drive head and driving equipment contact the torque pin. The portion of the driving equipment that contacts the torque pin can be referred to as a dog bone. The groove that the strain gauge is positioned within can act to focus the stress caused by the torque applied to the torque pin by the drive head and the torque applied to the torque pin by the driving equipment into the area of the torque pin within the groove when the groove is located between and preferably at the centroid of, the force exerted by the drive head on one end of the torque pin (e.g., section 29 or 32 as shown in FIG. 1) and the force exerted by the driving equipment on the same end of the torque pin (e.g., on section 31 as shown in FIG. 1). Preferably the cross-sectional shape of the torque pin is circular, but other shapes can also be implemented. Preferably, the groove creates a bottom surface of the groove that is substantially parallel with the outer surface of the torque pin such that the bottom surface of the groove is radially symmetric with respect to a longitudinal axis of the torque pin. The groove can also have sides that are preferably perpendicular to the longitudinal axis of the torque pin, but may be at an angle to the longitudinal axis of the torque pin and/or may have a curved shape. The focusing of the stress into the area of the groove allows the strain gauge to be positioned onto the bottom surface of the groove to measure the strain in a plane that is a horizontal plane when the helical pile is vertical and the torque applied by the drive head and the torque applied by the driving equipment is around the vertical axis. Various embodiments incorporate 1, 2, 3, 4, or more strain gauges to measure the torque applied by the drive head and the torque applied by the driving equipment. In the embodiment shown in FIGS. 1-6, four strain gauges are positioned in grooves 4 and 8, with the four strain gauges lying in the same plane, which also includes the longitudinal axis of the torque pin, and is the horizontal plane when the drive head provides a torque around the vertical axis. In this embodiment, two of the strain gauges are in groove 4, with one strain gauge on each side of the torque pin (a first side out of paper in FIG. 1 and the other side into the paper in FIG. 1). In an embodiment with only 1 or 2 strain gauges, preferably the strain gauges on the side of the torque pin that stretches when the torques are applied by the drive head and driving equipment (groove 8—the side out of paper and groove 4—the side into the paper in FIG. 1 for a clockwise torque around the vertical axis).

Strain gauges 2 and 9 measure the applied forces transferred from the drive head 19 to the torque pin 1 and from the torque pin 1 to the driving equipment 27 as the helical pile is rotated into the ground by rotating the driving end 21. The connection of the drive head 19 to the driving equipment 27 via the torque pin 1 causes the drive head to apply one or more forces onto the torque pin causes the driving equipment to apply one or more additional forces to the torque pin 1, at different distances out from the center point of rotation of the torque pin during the rotation of the drive head 19, such that the one or more forces applied to the torque pin by the drive head create a first torque in a first rotation direction (e.g., clockwise) and the one or more additional forces applied to the torque pin by the driving equipment create a second torque in a second rotation directional that is opposite to the first (e.g., counter-clockwise), where the second torque is approximately the same as the firs torque (second torque≤first torque). The applied forces applied by the drive head to sections 30 and 32 of the torque pin are measured in two directions. Firstly, the force in the horizontal plane (parallel to the ground if the drive head is pointing down), which is the force exerted on the torque pin 1 to cause rotation in order to rotate the helical pile as the helical pile is being advanced into the ground. Secondly, the force in the vertical direction, which is applied to help advance the helical pile, will measure the amount of crowd or downward/upward force being applied during installation of the helical pile. The crown or downward/upward force applied during installation can be measured by one or more strain gauges positioned on the torque pin. In a preferred embodiment, a strain gauge can be placed in the center of the torque pin on the top of the torque pin and a second strain gauge can be positioned on the bottom of the torque pin in the center of the torque pin. The one or more strain gauges can be located in grooves to protect the strain gauges from damage and to allow wiring from the strain gauges to be protected as well. Other embodiments can use a single strain gauge or more than two strain gauges. The strain gauges can also be located away from the center of the torque pin and away from the top and/or bottom of the torque pin, where the top and bottom lie in the vertical plane with the longitudinal axis of the torque pin. The two forces in the horizontal plane can be correlated into the amount of torque being applied to rotate the helical pile. In an embodiment, the axial force (vertical) applied to aid in the advancement can also be utilized to determine torque.

An aperture 10 can be machined in the top of the torque pin to accommodate an accelerometer 3 to be mounted within the torque pin. The accelerometer can be positioned in other locations and more than one accelerometer can be used. The accelerometer can measure the inclination angle of the drive head with respect to vertical that the helical pile is being installed by measuring the inclination of the torque pin with respect to the horizontal plane. The accelerometer can also measure shock forces experienced by the torque pin, which can occur when, for example, the helical pile hits rock during installation. Another aperture 11 can be machined into the torque pin 1 for routing the wiring of the strain gauges to exit out of axial aperture 22 and relay the information to the data capturing device. A groove 6 will be machined into the top of the pin to allow the wiring from the far strain gauge 9 to travel along the torque pin 6 and enter the aperture 11 and through the central drilled bore 7 and out the axial aperture 22 of the torque pin. As the helical pile is being rotated into the ground the reaction force will be transferred to the torque pin 1 where the torque pin interconnects the drive head 19 to the driving equipment 27. The reaction forces on the torque pin from the helical pile installation will be measured by strain gauges bonded to the pin that send a signal output in the form of electrical resistance to a data capturing device. A correlation factor can be used to convert the change in resistances to applied forces and/or applied torques.

A variety of strain gauges can be utilized in accordance with embodiments of the subject application. A strain gauge is a device used to measure the strain of an object. A first type of strain gauge that can be utilized incorporates an insulating flexible backing that supports a metallic foil pattern. The gauge is attached to the torque pin 1 by a suitable adhesive, such as cyanoacrylate. As the torque pin is deformed, the foil is deformed, causing its electrical resistance to change. This resistance change, which can be measured using a Wheatstone bridge, is related to the strain by a quantity known as the gauge factor. In an embodiment, the strain gauge can utilize the dependence of electrical conductance on the geometry of a conductor incorporated in the strain gauge. In an embodiment, a strain gauge can use a long, thin conductive strip in a zig-zag pattern of parallel lines such that a small amount of stress in the direction of the orientation of the parallel lines results in a larger strain over the effective length of the conductor and from the measured electrical resistance of the strain gauge, the amount of applied stress may be inferred.

The strain gauges can be attached to the torque pin with a glue, such as cyanoacrylic glue and/or epoxy glue.

In specific embodiments, semiconductor strain gauges, or piezoresistors, can be used. In other embodiments, capacitive strain gauges using a variable capacitor to indicate the level of mechanical deformation can be used.

A calibration table can be used to calibrate readings from strain gauges attached to the torque pin and the forces and/or torques applied to the torque pin 1. The signal outputs from the strain gauges on the torque pin can be correlated to the forces applied to the torque pin. The strain gauges 2 and 9 send signals corresponding to electrical resistance, or conductance, back to the data capturing device, which can capture and record the changes in resistance, or conductance. A computer processor or other apparatus can correlate the change in the signal output from the strain gauge to the forces being applied to the torque pin. In a specific embodiment, the calibration table incorporates a thick solid steel table 18 to which all the various components can be mounted. Two hydraulic cylinders 13 are mounted (at opposing ends) to a base plate 16, which is attached to T-grooves 17 machined into the steel table via T-slot bolts. The T-grooves allow for versatility in positioning the equipment to test/calibrate different lengths of torque pins 1. The ends 25 of the hydraulic rams 28 can be threaded to allow the custom load cells 12 (which accept the male threaded end 25 of the ram 28) to be securely fastened and become an integral part of the hydraulic cylinder. Threaded into the opposing end of the load cell is a machined sleeve 14, which holds the torque pin and represents the connection 26 of the torque pin to the drive head 19. The sleeves are preferably positioned so that the sleeves contact the torque pin during calibration at the same positions as the drive head contacts the torque pin during installation of the helical pile such that the forces are applied at the same position on the torque pin. The torque pin 1 is held stationary by a machined block 15 that is bolted down to the steel table. This stationary block represents the connection of the torque pin to the driving equipment 27. Preferably, the stationary block is positioned to contact the torque pin during calibration at the same place as the driving equipment contacts the torque pin during installation of a helical pile such that the forces are applied at the same positions on the torque pin. The two opposing hydraulic cylinders apply the loads in opposite directions, applying a force couple and simulating the torque applied from the drive head connection points 26 to the torque pin as the helical pile is being rotated into the ground. The block 15 applies a second torque to the torque pin that simulates the torque applied to the torque pin by the driving equipment. The torque pin strain gauges 2 and 9 are wired to a data capturing device that measures the change in strain gauge signal output while the load is being applied by the hydraulic cylinders. The applied loads from the hydraulic cylinders can be monitored and recorded by the data capturing device connected to the load cells 12, which can also utilize strain gauges to measure load. By measuring the change in signal output from the torque pin strain gauges as incremental loads are applied, a correlation factor can be developed that relates the applied force to the change in signal output, which can then be converted into torque with a simple calculation based on the distance between the opposing connection ends.

The following are specific embodiments of the subject invention:

Embodiment 1. A torque pin for use with a helical pile driver having a drive head, the torque pin comprising;
  a pin body;
  at least one strain gauge attached to the body, for measuring at least one force applied to the torque pin;
  a communication structure, wherein the communication structure allows force data to be communicated from the at least one strain gauge to a data capturing device; and
  a coupler, wherein the coupler couples the pin body to a drive head of a helical pile driver.

Embodiment 2. The torque pin of Embodiment 1, further comprising at least one accelerometer attached to the body for measuring the inclination of the torque pin or the shock force applied to the torque pin or both.

Embodiment 3. The torque pin of Embodiment 2, wherein the accelerometer is mounted within the body.

Embodiment 4. The torque pin of any one of Embodiments 1 to 3, wherein the body is tubular.

Embodiment 5. The torque pin of any one of Embodiments 1 to 4, wherein the at least one strain gauge is attached by an adhesive.

Embodiment 6. The torque pin of Embodiment 5, wherein the adhesive is glue.

Embodiment 7. The torque pin of Embodiment 6, wherein the glue is selected from the group consisting of cyanoacrylic glue, epoxy glue, and a combination thereof.

Embodiment 8. The torque pin of any one of Embodiments 1 to 7, wherein the at least one strain gauge is a piezoresistor or a capacitive strain gauge.

Embodiment 9. The torque pin of any one of Embodiments 1 to 8, wherein the body has at least one groove for mounting the at least one strain gauge therein.

Embodiment 10. The torque pin of Embodiment 9, wherein the grooves are located at stress transfer points created by the interaction of the torque pin with the drive head.

Embodiment 11. The torque pin of either one of Embodiments 9 or 10, wherein the grooves are less than or equal to ¼ inch deep.

Embodiment 12. The torque pin of either one of Embodiments 9 or 10, wherein the grooves are at least 1/16 of an inch deep.

Embodiment 13. The torque pin of any one of Embodiments 1 to 12, wherein the means for communicating force data to a data capturing device is wired.

Embodiment 14. The torque pin of any one of Embodiments 1 to 12, wherein the means for communicating force data to a data capturing device is wireless.

Embodiment 15. The use of the torque pin of any one of Embodiments 1 to 14, for measuring, monitoring, or recording, or a combination thereof, at least one force applied to the torque pin.

Embodiment 16. A system for measuring at least one force applied to a torque pin, comprising:
  the torque pin of any one of Embodiments 1 to 14;
  a data capturing device in communication with the torque pin; and
  a measuring device for measuring the force data in communication with the data capturing device.

Embodiment 17. The system of Embodiment 16, further comprising a display in communication with the data capturing device, the measuring device, or both.

Embodiment 18. The system of either one of Embodiments 16 or 17, further comprising a recording device in communication with the data capturing device, the measuring device, the display device or a combination thereof Embodiment 19. A system for monitoring at least one force applied to a torque pin, comprising
  the torque pin of any one of Embodiments 1 to 14;
  a data capturing device in communication with the torque pin; and
  a monitoring device for monitoring the force data in communication with the data capturing device.

Embodiment 20. The monitoring system of Embodiment 19, further comprising a display in communication with the data capturing device, the monitoring device, or both.

Embodiment 21. The monitoring system of either one of Embodiments 19 or 20, further comprising a recording device in communication with the data capturing device, the monitoring device, the display device or a combination thereof.

Embodiment 22. A system for recording at least one force applied to a torque pin, comprising
  the torque pin of any one of Embodiments 1 to 14;
  a data capturing device in communication with the torque pin; and
  a recording device for recording the force data in communication with the data capturing device.

Embodiment 23. The recording system of Embodiment 22, further comprising a display in communication with the data capturing device, the recording device, or both.

Embodiment 24. A method of measuring at least one force applied to a torque pin, comprising:
  providing the torque pin of any one of Embodiments 1 to 14;
  applying at least one force to the force to the torque pin;
  capturing force data from the torque pin; and
  measuring the force data.

Embodiment 25. The method of Embodiment 24, further comprising displaying the force data.

Embodiment 26. The method of either one of Embodiments 16 or 17, further comprising recording the force data.

Embodiment 27. A method of monitoring at least one force applied to a torque pin, comprising
  providing the torque pin of any one of Embodiments 1 to 14;
  applying at least one force to the force to the torque pin;
  capturing force data from the torque pin; and
  monitoring the force data.

Embodiment 28. The method of Embodiment 27, further comprising displaying the force data.

Embodiment 29. The method of either one of Embodiment 27 or 28, further comprising recording the force data.

Embodiment 30. A method of recording at least one force applied to a torque pin, comprising
providing the torque pin of any one of Embodiments 1 to 14;
applying at least one force to the force to the torque pin;
capturing force data from the torque pin; and
recording the force data.

Embodiment 31. The method of Embodiment 30, further comprising displaying the force data.

Embodiment 32. A calibration table for calibrating forces applied to a torque pin, comprising;
a table;
a first base plate mounted towards one end of the table;
a second base plate mounted towards a table end opposite the first base plate;
a first hydraulic cylinder moveably mounted on the first base plate having an inwardly extending first hydraulic ram;
a second hydraulic cylinder moveably mounted on the second base plate having an inwardly extending second hydraulic ram;
a block, moveably mounted on and secured to the table between the first and second base plates, for retaining the torque pin;
a first and second sleeve, mounted on opposite ends of the block for receiving opposing ends of the torque pin;
a first load cell connecting the first hydraulic ram and the first sleeve;
a second load cell connecting the second hydraulic ram and the second sleeve; and
a data capturing device in communication with the first and second load cells for recording force applied to the torque pin by the first and second hydraulic cylinders.

Embodiment 33. The calibration table of Embodiment 32, wherein the first and second base plates are mounted on substantially parallel T-grooves in the table.

Embodiment 34. The calibration table of either one of Embodiments 32 or 33, wherein the block is mounted on central T-grooves in the table.

Embodiment 35. The calibration table of any one of Embodiments 32 to 34, wherein the block is secured to the table using at least one bolt.

Embodiment 36. The calibration table of any one of Embodiments 32 to 35, wherein the first and second hydraulic rams have a threaded end for connecting to the first or second load cell.

Embodiment 37. The calibration table of any one of Embodiments 32 to 36, wherein the table is made of steel.

Embodiment 38. A method of calibrating a torque pin, the method comprising;
a) providing the calibration table of any one of claims 32 to 37;
b) securing the torque pin in the block;
c) positioning the ends of the torque pin in the first and second sleeves;
d) applying loads in opposite directions on the torque pin using the first and second hydraulic cylinders;
e) capturing strain gauge signal output data after load is applied;
f) capturing load application data after load is applied; and
g) repeating steps d) to f) to develop a correlation factor that relates the applied load to the change in signal output.

Embodiment 39. The method of Embodiment 38, whereby the positioning of the ends of the torque pin in the first and second sleeve substantially correlate to where the torque pin ends contact the drive head of the helical pile driver.

Embodiment 40. The method of either one of Embodiments 38 or 39, wherein the loads applied by the first and second hydraulic cylinders are of substantially equal magnitudes.

Aspects of the invention such as capturing the strain gauge data, correlating the strain gauge data with the forces applied to the torque pin during calibration, and determining the torque applied from the strain gauge data and the calibration factor(s) may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

REFERENCE NUMBER LEGEND 1. torque pin
2. strain gauge
3. accelerometer
4. grooves
5. head
6. groove
7. center drilled bore
8. groove
9. strain gauge
10. aperture
11. aperture
12. load cells
13. hydraulic cylinder
14. sleeve
15. block
16. base plate
17. T-grooves
18. table
19. drive head
20. driving equipment
21. driving end
22. T-slot bolts
23. strain gauge
24. threaded ends
25. hydraulic ramp
26. connection
27. driving equipment
28. hydraulic ramp
29. threaded bore
30. first end section
31. middle section
32. second end section

I claim:

1. A torque pin for use with a helical pile driver having a drive head, the torque pin comprising;
a pin body;
at least one strain gauge attached to the pin body, for measuring at least one force applied to the pin body;
a data capturing device, wherein the data capturing device captures force data from the at least one strain gauge to; and
a coupler, wherein the couple couples the pin body to a drive head of a helical pile driver.

2. The torque pin of claim 1, further comprising at least one accelerometer attached to the pin body, wherein the accelerometer measures an inclination of the pin body or a shock force applied to the pin body.

3. The torque pin of claim 2, wherein the accelerometer is mounted within the pin body.

4. The torque pin of claims 1, wherein the pin body is tubular.

5. The torque pin of claim 1, wherein the at least one strain gauge is attached to the pin body by an adhesive.

6. The torque pin of claim 5, wherein the adhesive is glue.

7. The torque pin of claim 6, wherein the glue is selected from the group consisting of: cyanoacrylic glue, epoxy glue, and a combination thereof.

8. The torque pin of claim 1, wherein the at least one strain gauge comprises a piezoresistor strain gauge or a capacitive strain gauge.

9. The torque pin of claim 1, wherein the pin body has at least one groove wherein the at least one strain gauge is positioned in the at least one groove.

10. The torque pin of claim 9, wherein the at least one groove is located at one or more stress transfer points created by an interaction of the pin body with the drive head.

11. The torque pin of claim 9, wherein the at least one groove has a depth less than or equal to ¼ inch.

12. The torque pin of claim 9, wherein the at least one groove has a depth of at least ¹⁄₁₆ of an inch.

13. The torque pin of claim 1, wherein the data capturing device receives the force data from the at least one strain gauge via one or more wires.

14. The torque pin of claim 1, wherein the data capturing device receives the force data from the at least one strain gauge wirelessly.

15. A method of measuring torque applied to a helical pile driver having a drive head, comprising:
providing a torque pin, wherein the torque pin comprises:
a pin body;
at least one strain gauge attached to the pin body, for measuring at least one force applied to the pin body;
a data capturing device, wherein the data capturing device captures force data from the at least one strain gauge to; and
a coupler, wherein the couple couples the pin body to a drive head of a helical pile driver;
measuring at least one force applied to the pin body; and
determining a torque applied to a drive head of a helical pile driver.

16. A system for measuring at least one force applied to a torque pin, comprising:
a torque pin, wherein the torque pin comprises:
a pin body;
at least one strain gauge attached to the pin body, for measuring at least one force applied to the pin body;
a data capturing device, wherein the data capturing device captures force data from the at least one strain gauge to;
a coupler, wherein the couple couples the pin body to a drive head of a helical pile driver;
a measuring device, wherein the measuring device measures at least one force applied to the pin body from the data capturing device.

17. The system of claim 16, further comprising a display, wherein the display displays the at least one force applied to the pin body.

18. The system claim 16, further comprising a recording device, wherein the recording device records the at least one force applied to the pin body.

19. A system for monitoring at least one force applied to a torque pin, comprising:
 a torque pin, wherein the torque pin comprises:
 a pin body;
 at least one strain gauge attached to the pin body, for measuring at least one force applied to the pin body;
 a data capturing device, wherein the data capturing device captures force data from the at least one strain gauge to;
 a coupler, wherein the couple couples the pin body to a drive head of a helical pile driver; and
 a monitoring device, wherein the monitoring device monitors the force data captured by the data capturing device.

20. The monitoring system of claim 19, further comprising a display, wherein the display displays the at least one force applied to the pin body.

21. The monitoring system of claim 19, further comprising a recording device, wherein the recording device records the at least one force applied to the pin body.

22. A system for recording at least one force applied to a torque pin, comprising:
 a torque pin, wherein the torque pin comprises:
 a pin body;
 at least one strain gauge attached to the pin body, for measuring at least one force applied to the pin body;
 a data capturing device, wherein the data capturing device captures force data from the at least one strain gauge to;
 a coupler, wherein the couple couples the pin body to a drive head of a helical pile driver; and
 a recording device, wherein the recording device records the force data captured by the data capturing device.

23. The recording system of claim 22, further comprising a display, wherein the display displays the at least one force applied to the pin body.

24. A method of measuring at least one force applied to a torque pin, comprising:
 providing a torque pin, wherein the torque pin comprises:
 a pin body;
 at least one strain gauge attached to the pin body, for measuring at least one force applied to the pin body;
 a data capturing device, wherein the data capturing device captures force data from the at least one strain gauge to; and
 a coupler, wherein the couple couples the pin body to a drive head of a helical pile driver;
 applying at least one force to the pin body;
 capturing force data from the at least one strain gauge; and
 measuring the force data.

25. The method of claim 24, further comprising displaying the force data.

26. The method of claim 16, further comprising recording the force data.

27. A method of monitoring at least one force applied to a torque pin, comprising:
 providing a torque pin, wherein the torque pin comprises:
 a pin body;
 at least one strain gauge attached to the pin body, for measuring at least one force applied to the pin body;
 a data capturing device, wherein the data capturing device captures force data from the at least one strain gauge to; and
 a coupler, wherein the couple couples the pin body to a drive head of a helical pile driver;
 applying at least one force to the pin body;
 capturing force data from the at least one strain gauge; and
 monitoring the force data.

28. The method of claim 27, further comprising displaying the force data.

29. The method of claim 27, further comprising recording the force data.

30. A method of recording at least one force applied to a torque pin, comprising:
 providing a torque pin, wherein the torque pin comprises:
 a pin body;
 at least one strain gauge attached to the pin body, for measuring at least one force applied to the pin body;
 a data capturing device, wherein the data capturing device captures force data from the at least one strain gauge to; and
 a coupler, wherein the couple couples the pin body to a drive head of a helical pile driver;
 applying at least one force to the pin body;
 capturing force data from the at least one strain gauge; and
 recording the force data.

31. The method of claim 30, further comprising displaying the force data.

32. A calibration table for calibrating forces applied to a torque pin, comprising:
 a table;
 a first base plate mounted towards a first end of the table;
 a second base plate mounted towards a second end of the table, wherein the second end is opposite the first end;
 a first hydraulic cylinder moveably mounted on the first base plate having an inwardly extending first hydraulic ram;
 a second hydraulic cylinder moveably mounted on the second base plate having an inwardly extending second hydraulic ram;
 a block, moveably mounted on and secured to the table between the first and second base plates, for retaining the torque pin;
 a first and second sleeve, mounted on opposite ends of the block for receiving opposing ends of the torque pin;
 a first load cell connecting the first hydraulic ram and the first sleeve;
 a second load cell connecting the second hydraulic ram and the second sleeve; and
 a data capturing device in communication with the first and second load cells for recording force applied to the torque pin by the first and second hydraulic cylinders.

33. The calibration table of claim 32, wherein the first and second base plates are mounted on substantially parallel T-grooves in the table.

34. The calibration table of claim 32, wherein the block is mounted on central T-grooves in the table.

35. The calibration table of claim 32, wherein the block is secured to the table using at least one bolt.

36. The calibration table of claim 32, wherein the first and second hydraulic rams have a threaded end for connecting to the first or second load cell.

37. The calibration table of claim 32, wherein the table is made of steel.

38. A method of calibrating a torque pin, the method comprising:
 a) providing a calibration table, wherein the calibration table comprises:
 a table;
 a first base plate mounted towards a first end of the table;

a second base plate mounted towards a second end of the table, wherein the second end is opposite the first end;

a first hydraulic cylinder moveably mounted on the first base plate having an inwardly extending first hydraulic ram;

a second hydraulic cylinder moveably mounted on the second base plate having an inwardly extending second hydraulic ram;

a block, moveably mounted on and secured to the table between the first and second base plates, for retaining the torque pin;

a first and second sleeve, mounted on opposite ends of the block for receiving opposing ends of the torque pin;

a first load cell connecting the first hydraulic ram and the first sleeve;

a second load cell connecting the second hydraulic ram and the second sleeve; and a data capturing device in communication with the first and second load cells for recording force applied to the torque pin by the first and second hydraulic cylinders;

b) securing the torque pin in the block;

c) positioning the ends of the torque pin in the first and second sleeves;

d) applying loads in opposite directions on the torque pin using the first and second hydraulic cylinders;

e) capturing strain gauge signal output data after load is applied;

f) capturing load application data after load is applied; and g) repeating steps d) to f) to develop a correlation factor that relates the applied load to the change in signal output.

39. The method of claim 38, wherein the positioning of the ends of the torque pin in the first and second sleeve substantially correlate to where the torque pin ends contact the drive head of a helical pile driver.

40. The method of claim 38, wherein the loads applied by the first and second hydraulic cylinders are of substantially equal magnitudes.

* * * * *

UNITED STATES PATENT AND TRADEMARK OFFICE
CERTIFICATE OF CORRECTION

PATENT NO. : 8,966,953 B2  
APPLICATION NO. : 13/841159  
DATED : March 3, 2015  
INVENTOR(S) : Ben Kasprick Page 1 of 1

It is certified that error appears in the above-identified patent and that said Letters Patent is hereby corrected as shown below:

In the claims

Column 12,  
Line 2, Claim 1, "one strain gauge to; and" should read --one strain gauge; and--

Column 12,  
Line 12, Claim 4, "The torque pin of claims 1" should read --The torque pin of claim 1--

Column 12,  
Line 48, Claim 15, "at least one strain gauge to;" should read --at least one strain gauge;--

Column 12,  
Line 62, Claim 16, "at least one strain gauge to;" should read --at least one strain gauge;--

Column 13,  
Line 14, Claim 19, "at least one strain gauge to;" should read --at least one strain gauge;--

Column 13,  
Line 33, Claim 22, "at least one strain gauge to" should read --at least one strain gauge--

Column 13,  
Line 48, Claim 24, "at least one strain gauge to" should read --at least one strain gauge--

Column 13,  
Line 66, Claim 27, "at least one strain gauge to" should read --at least one strain gauge--

Column 14,  
Line 17, Claim 30, "at least one strain gauge to" should read --at least one strain gauge--

Signed and Sealed this  
Sixth Day of October, 2015

Michelle K. Lee  
*Director of the United States Patent and Trademark Office*